United States Patent

[11] 3,577,661

[72] Inventor Eldo Gene Usrey
 2052 Sunnybrook, Garland, Tex. 75040
[21] Appl. No. 842,120
[22] Filed July 16, 1969
[45] Patented May 4, 1971

[54] TEACHING AID
 6 Claims, 6 Drawing Figs.
[52] U.S. Cl. .................................................. 35/32, 235/114
[51] Int. Cl. ........................................... G09b 19/02, G06c 27/00
[50] Field of Search ........................................... 35/30, 31 (A), 32, 74; 235/74, 76, 114, 155

[56] References Cited
UNITED STATES PATENTS
432,393   7/1890   Fitzwater .................... 235/74
984,397   2/1911   Giegfried .................... 235/74
3,436,013 4/1969   Campbell ..................... 235/74

Primary Examiner—William H. Grieb
Attorney—David P. Cullen

ABSTRACT: The present invention relates to apparatus for aid in the instruction of mathematics and, more particularly, it relates to apparatus for demonstrating counting systems to a base other than 10. In one form, the present invention may comprise a mechanical input means which functions to place arithmetical units of one into the system. In operative engagement with the unit input means is provided a variant base register means for registering the sum of units from the unit input means in a counting system having a base other than 10. In a preferred embodiment, a decimal register means is also provided in operative engagement with the unit input means for registering the sum of units from the unit input means in the decimal system for purposes of comparison of the totals in the decimal system with the totals in the variant base system.

ELDO GENE USREY
INVENTOR.

BY David P. Cullen

ATTORNEY

PATENTED MAY 4 1971 3,577,661

ELDO GENE USREY
INVENTOR.

BY

ATTORNEY

3,577,661

TEACHING AID

BACKGROUND OF THE INVENTION

For the past two or three thousand years Western civilization has, in its arithmetical system, relied upon the base 10. Thus, it will occur to the thoughtful reader that the ancient system of Roman numerals is, insofar as their base is concerned, as up-to-date as the popular arithmetic system currently used in American schools and industry. Perhaps due to the long familiarity which Western man has experienced with the numerical system based on the number 10, for many generations, up the recent past, our educational processes either ignored or had forgotten the basic concepts underlying our mathematical system. Thus, when adding a column of figures, one did not transfer from the right-hand column to the next adjacent a number of groups of 10 but rather one merely "carried to two" or three or whatever the number might have been. Similarly, in the next column one did not transfer groups of 100 but rather "carried the one" or the 5 or whatever it might have been. Thus, our teaching of mathematics became a matter of rote with no attempt to understand the underlying principles which were being applied.

Within the last few years it has occurred to many leading educators that some of the theories underlying our arithmetical system might be better demonstrated by an analysis of other arithmetical systems based on some integer other than ten. When working with such other systems, which herein shall be called "variant base systems," it is ordinarily not possible to apply the rote which has come to characterize our teaching of the decimal system. Instead, it is necessary to analyze what is actually being done and what the basis principles underlying these variant base systems actually are.

Because the rote of the decimal system is engrained into our educational approach, it is quite desirable that graphic or mechanical means be used, at least in the initial phases of introduction to variant base systems, to visually demonstrate the manner in which such systems vary and in which totalizing in such systems is registered. Moreover, in order to add meaning to such systems, it is highly desirable to visually demonstrate the comparison of totalizing and the like with similar operations in the decimal system. For those purposes the present invention was developed.

DESCRIPTION OF THE DRAWINGS

Apparatus embodying one form of the invention for fulfilling the needs set forth immediately above is disclosed in the following description which is to be read in conjunction with the accompanying drawings wherein like reference characters designate like parts in all views and wherein.

GENERAL DESCRIPTION OF THE APPARATUS

Figure 1:
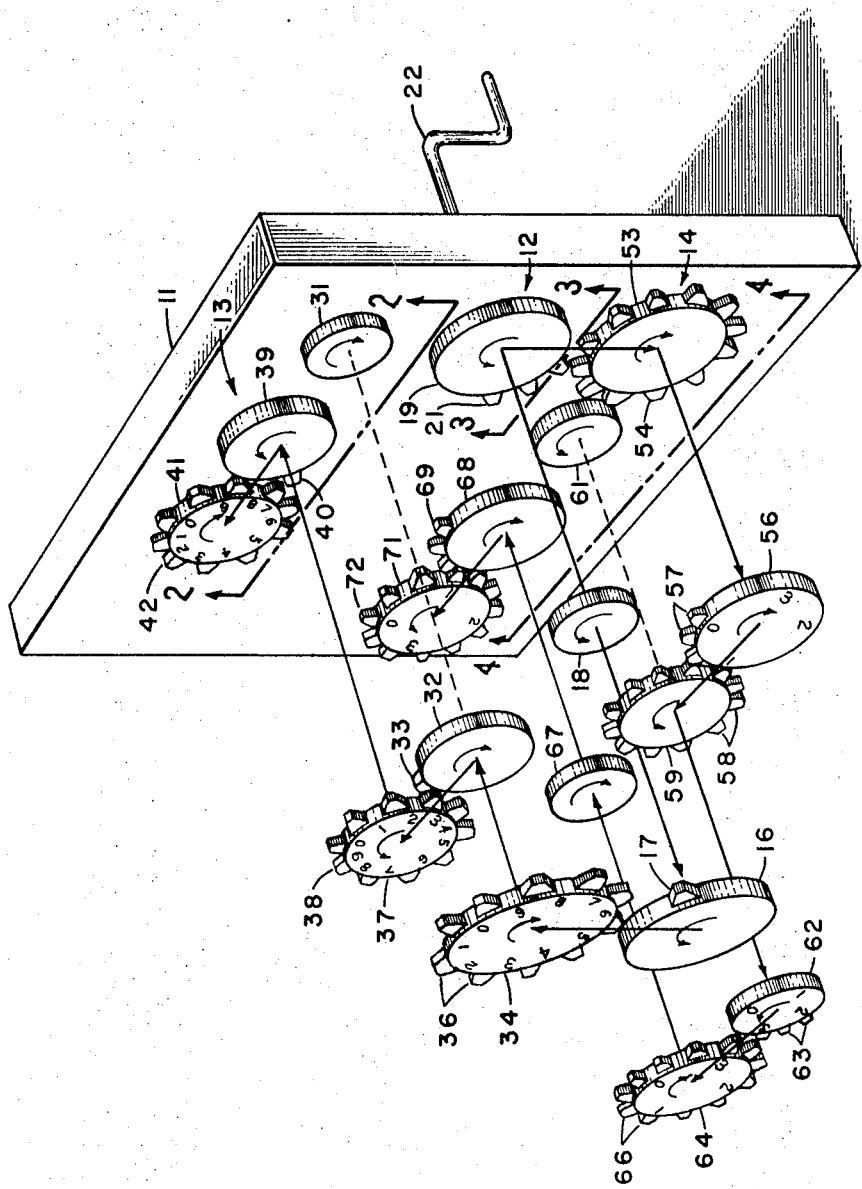
FIG. 1 is a perspective exploded view of one form of apparatus useful in practicing the present invention showing a decimal register and a variant base register to the base four, each of which is operatively connected to a unit input means.

Turning now to the drawings and particularly to FIG. 1, there is shown in exploded view apparatus for registering a given number both in the decimal system and also in the variant base system. In the specific disclosure shown in the drawings, the base which has been chosen for the variant base system is four. It is to be understood, however, that the base four structure is typical of the structure which would be utilized for any other base; and the present invention, while preferably utilized to demonstrate arithmetic bases from 2 to 9, inclusive, can be used to demonstrate arithmetic systems having any integer other than one as a base.

In FIG. 1 the apparatus may be seen to consist generally of a frame 11 at the central, right-hand portion of which is mounted unit input means indicated generally by the numeral 12. In operative engagement with unit input means 12 and arrayed along a horizontal line near the top of frame 11 is a decimal register means 13 which totals in the decimal system the units which are fed into the decimal register means from unit input means 12. Similarly, a variant base register means, in this case to the base four, is provided adjacent the lower portion of frame 11 and in operative engagement with unit input means 12 whereby the total of the units placed into the system by the unit input means may be registered by the base four register means 14. Since both the decimal and base four register means are operated simultaneously from the input means, it is possible to maintain continuously and graphically a representation of a sum in both the decimal and base four systems. Similarly structure can be sued for obtaining visual comparison between a number in the base 10 system and a corresponding number in any arithmetic system having a base other than 10, herein referred to as "variant base systems."

SPECIFIC STRUCTURE OF UNIT INPUT MEANS 12

Unit input means 12 functions to place arithmetic units, i.e. "ones," into the system of the present invention. As such, it includes a rotary member made up of decimal input means, such as an upper disc 16, having formed on the outer periphery thereof a single tooth 17 which intersects an arc of 36° along the periphery of the disc. On the outer face of disc 16, at the upper portion thereof as viewed in FIG. 1, there is scribed the numeral 11, which indicates an input on one unit for each 360° of rotation of unit input means 12. Immediately adjacent disc 16 is a spacer 18 which separates disc 16 from variant base input means, such as a base four input disc 19. Arranged along the outer periphery of base four input disc 19 are a plurality of teeth 21 which, as a group, intersect 90° of arc along the periphery of disc 19.

In the general case it is important to note that the arc intersected by teeth 21 on the variant base disc 19 will be equal to $\theta°$ wherein $$\theta = \frac{360°}{X}$$

and wherein $X =$ an integer other than 1 or 10 which is chosen to correspond to the arithmetic base to be demonstrated. Preferably X will be an integer from 2 to 9, inclusive. In the following discussion, reference will be made to an arc of $\theta°$, and this term may be read as 90° when considering the base four structure shown in the drawings.

Means, such as crank 22 passing through an aperture in frame 11, are provided for rotating unit input means 12. A washer 23 is provided integral with crank 22 adjacent the rear of frame 11 to provide positional stability to unit input means 12.

SPECIFIC DESCRIPTION OF THE STRUCTURE OF DECIMAL REGISTER MEANS 13

Figure 2:
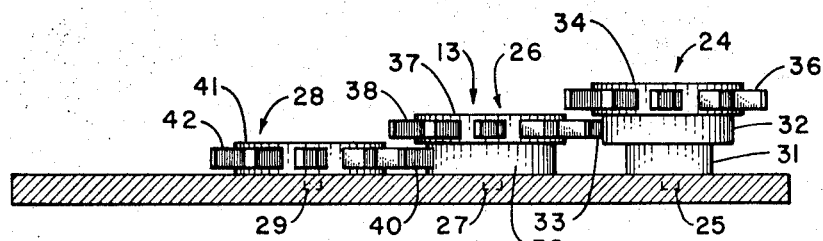
FIG. 2 is a side view of a decimal register system taken along line 2—2 of FIG. 1 with the various components of the decimal register system in their nonexploded positions.
Figure 3:
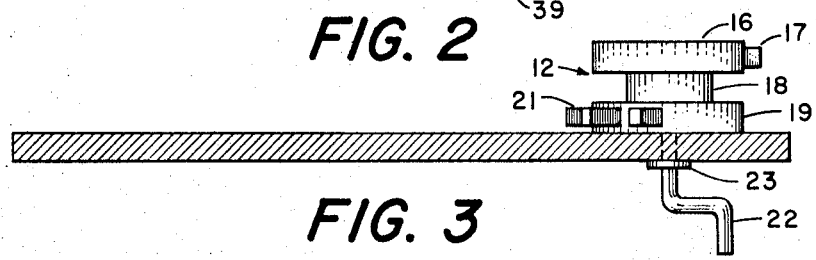
FIG. 3 is a side view of a unit input means taken along line 3—3 of FIG. 1 with the various components of the unit input means in their nonexploded positions.

As best shown in FIG. 2, decimal register means 13 includes a decimal unit counter assembly 24 which is mounted on frame 11 by a stub shaft 25 and which engages a portion of unit input means 12. A "tens" counter assembly 26 is rotatably mounted on frame 11 by means of a shaft 27 immediately adjacent the decimal unit counter, while "hundreds" counter 28 is also rotatably positioned on frame 11 by means of a stub shaft 29 in such a position as to be engaged by a portion of the "tens" counter 26.

Decimal unit counter 24 includes at its lower portion a spacer disc 31 which slides upon the surface of frame 11 in its rotation about stub shaft 25. Disc 31 functions to provide clearance between the other elements of decimal unit counter 24 and corresponding elements of the unit input means. Rigidly secured to the upper surface of spacer disc 31 is a "tens" output disc 32 having one tooth 33 thereon which intersects 36° of arc around the periphery of disc 32. Tooth 33 is positioned to engage a portion of "tens" counter 26 during 36° of each 360° of rotation of decimal unit counter 24.

A unit input disc 34 is rigidly secured to the upper surface of "tens" output disc 32 and has around the outer periphery thereof a continuous set of teeth 36 which are engaged by tooth 17 of decimal input means 16. The outer surface of disc 34 is scribed with a counterwise series of numbers from 0 to 9, each of which is separated from adjacent numbers by an arc of 36°. The apparatus is shown with the 0 being positioned at the top of the disc.

The "tens" counter 26 is designed so that it is rotated 36° for every 360° of rotation of decimal unit counter 24. To this end there is provided as a portion of "tens" counter 26 a "tens" input disc 37 which carries an uninterrupted series of teeth 38 around the outer periphery thereof which teeth are engaged by tooth 33 on "tens" output disc 32. A series of numbers from 0 to 9 are scribed on the outer surface of "tens" input disc 37 with the numbers being spaced 36° apart and progressing clockwise around the disc, as shown in FIG. 1. This is to be compared with the counterclockwise progression of the numbers on unit input disc 34 and is provided in this manner due to the different direction of rotation between these two elements. A "hundreds" output disc 39 is mounted on frame 11 by stub shaft 27 and is integral with the underside of "tens" input disc 37 so that discs 37 and 39 move as a unit under impetus from tooth 33 of "tens" output disc 32. A tooth 40 projects outwardly from a point on the periphery of "hundreds" output disc 39 and intersects 36° of arc along the periphery of the disc. "Hundreds" counter 28 comprises a single "hundreds" input disc 41 on the outer periphery of which is formed a continuous series of teeth 42 which are engaged by tooth 40 of "hundreds" output disc 39 during 36° of each 360° of rotation of "tens" counter 26.

A counterclockwise progression of numbers from 0 to 9 are scribed at 36° intervals on the outer surface of "hundreds" input disc 41. By this means disc 41 is indexed 36°, i.e. from one number to the next higher number, with each 360° of rotation of "tens" counter 26 in a manner similar to the indexing of the other counter assemblies.

SPECIFIC STRUCTURAL FEATURES OF BASE FOUR REGISTER MEANS 14

As was pointed out earlier, reference will be made from time to time to the angle θ. As used in this specific description of a base four counter, the term "θ" may be read 90°.

In general, base four register means 14 comprises a plurality of register units including a base four unit register assembly 43 which is rotatably mounted on frame 11 by means of a stub shaft 44. Register assembly 43 is in operative engagement with base four input disc 19 which forms a portion of unit input means 12. Immediately adjacent base four unit register assembly 43 is a second level register assembly 46 which registers groups of four from the input of unit register assembly 43. Second level register assembly 46 is rotatably mounted on frame 11 by means of a stub shaft 47 whereby register assembly 46 is rotated θ° for each 360° of rotation of base four unit register assembly 43. Similarly, a third level register assembly 48 is rotatably mounted on frame 11 by means of a stub shaft indicated generally at 49. Register assembly 48 functions to totalize the number of groups of 16 from the output of second level register assembly 46. The number of groups of 64 is registered on a fourth level register assembly 51 rotatably mounted on frame 11 by means of a stub shaft 52 in operative engagement with a portion of third level register assembly 48.

As will be seen from the detailed discussion presented hereinafter, gears are provided whereby second level register assembly 46 is rotated θ° for each 36° of rotation of base four unit register assembly 43, while gears are provided for rotating the third and fourth level register assemblies θ° upon 360° rotation of the second and third level register assemblies, respectively.

Figure 4:
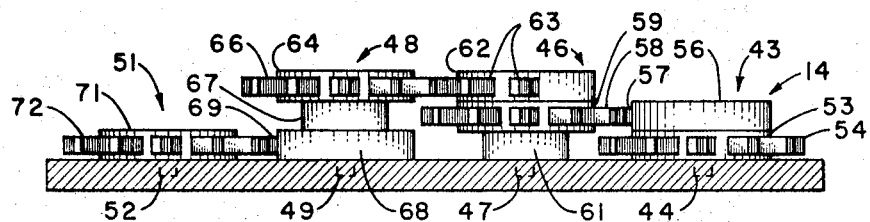
FIG. 4 is a side view of the base four register system taken along line 4—4 of FIG. 1 with the various components taken along of the register system in their nonexploded positions.

Base four unit register assembly 43 may be seen from FIGS. 1 and 4 to comprise a lower unit input disc 53 having continuous progression of teeth 54 thereon. Disc 53 is rotatably supported on stub shaft 44 and is in operative engagement with base four input disc 19 of unit input means 12. Secured to the upper surface of disc 53 is a second level output disc 56 having formed on the outer periphery thereof, intersecting an arc of θ°, a plurality of teeth 57. A progression of numerals from 0 to 3 in an ascending, counterclockwise sequence are, as indicated in FIG. 1, spaced on the outer surface of disc 56 at angles of θ°. Teeth 57 are so positioned as to project outwardly in a position to be engaged by a series of teeth 58 located on the outer periphery of a second level input disc 59 which forms one element of second level register assembly 46. A spacer disc 61 is integral with the lower surface of input disc 59 and rotates on stub shaft 47 while functioning to provide clearance between unit input disc 53 and second level register assembly 46. A third level output disc 62 is positioned upon the upper surface of input disc 59 and, as shown in FIG. 1, has scribed on the outer surface thereof a clockwise progression of numbers from 0 to 3 which are separated from each other by θ°. A plurality of teeth 63 intersecting an arc of θ° project from the periphery of output disc 62 into engagement with a portion of third level register assembly 48.

The portion of register assembly 48 which is engaged by teeth 63 comprises a third level input disc 64 having a continuous series of teeth 66 projecting therefrom into a position to be engaged by teeth 63 when such teeth are properly positioned by rotation of second level register assembly 46. A progression of numbers identical to those scribed on the outer surface of disc 56 are scribed on the outer surface of third level input disc 64 and, as stated earlier, function to indicate the number of groups of 16 which have been transmitted to the system from unit input means 12. A spacer disc 67 is integral with and immediately below input disc 64 and spaces the input disc from a fourth level output disc 68 with which it is integrally formed. Output disc 68 rotates on stub shaft 49 and carries in an arc of θ° about its periphery a series of teeth 69 which engage a portion of fourth level register assembly 51 during θ° of each 360° of rotation of third level register assembly 48.

A fourth level input disc 71 comprises register assembly 51. Input disc 71 includes a clockwise progression of numerals from 0 to 3 scribed on the outer surface thereof, as shown in FIG. 1, and also includes a continuous sequence of teeth 72 projecting from the periphery of disc 71 in a position be be engaged by teeth 69 of disc 68 when such teeth are properly positioned by rotation of third level register assembly 48.

ARRESTING STRUCTURE

Figure 5:
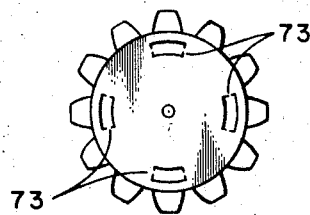
FIG. 5 is a bottom view of one of the discs forming a portion of the base four register system shown in FIG. 4 wherein four detent recesses are shown.
Figure 6:
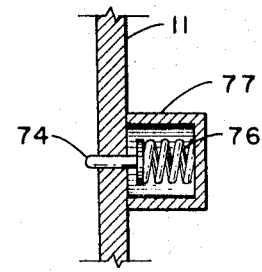
FIG. 6 is an enlarged sectional view of a detent which operates with recesses, such as those shown in FIG. 5, to prevent overriding of the various elements of the decimal register system and the base four register system.

In a system of rotary elements such as that described immediately above, there is always the potential problem of overriding which, in the described system, would prevent an accurate representation of the numbers being fed into the system. It is, therefore, contemplated that arresting structure will be incorporated in equipment made according to the foregoing teaching, although FIG. 1 through 4 do not disclose such structure, since it would add undue detail without contributing any clarity beyond that which can be achieved in FIGS. 5 and 6. In FIG. 5 there is shown the underside of what can be assumed to be unit input disc 53 which forms a portion of base four unit register assembly 43. Separated by arcs of $\theta°$ along the outer portion of disc 53 are a plurality of arcuate grooves 73. The structure of FIG. 6 is mounted on frame 11 so that the left end of a plunger 74 will project into one of the grooves 73 when one of the numbers on the face of disc 56 is in its uppermost position. Plunger 74 is urged into engagement with the underside of disc member 53 by compression spring 76 retained in a box housing 77 carried by frame 11. Since four of the grooves 73 are provided, it is by this means possible to temporarily secure disc 53 in each of its registering positions as it is indexed around 360°.

Similar structure is provided in each of the bottom discs of the assemblies forming the decimal register mans as well as in each of the bottom discs of the assemblies forming the variant, or base four, register means. It will be appreciated that in the case of the decimal register means, however, rather than four grooves separated by arcs of $\theta°$ there will be 10 such grooves, each being separated from adjacent grooves by an arc of 360°

OPERATION

In the operation of the present device let it be assumed that the teeth elements of the device are first positioned as shown in FIG. 1. In this position the upper numbers of both the decimal register means and the base four register means indicate 0. Crank 22 is then grasped to rotate unit input means 12 counterclockwise 360° whereupon teeth 21 engage teeth 54 on unit input disc 53 to rotate base four unit register assembly 43 90° in a clockwise direction thereby placing the numeral 1 on the face of second level output disc 56 in an upright position. Simultaneously, tooth 17 of decimal input means 16 engages one of the teeth 36 of unit input disc 34 to rotate decimal unit counter 24 36° in a clockwise direction thereby moving the numeral 1 scribed on the face of disc 34 into the "up" position. This process is repeated until unit input means 12 has been rotated four complete revolutions at the end of which the numeral 0 will be upright on disc 56 and teeth 57 will have moved second level input disc 59 $\theta°$ to move the numeral 1 scribed on the face of the third level output disc 62 into an upright position. Thus, it may be seen that for each 360° revolution of unit input means 12 there is a corresponding rotation of $\theta°$ of base four unit register assembly 43 and a 36° rotation of decimal unit counter 24 with a concurrent registration of the scribed numbers on the faces of the discs. Similarly, with each 360° revolution of second level register assembly 46 there will be a corresponding $\theta°$ revolution of third level register assembly 48 due to the interaction of teeth 63 with teeth 66. As will be obvious, a similar $\theta°$ to 360° ratio exists between the movement of fourth level register assembly 51 and the movement of third level register assembly 48.

In decimal register means 13, a rotation of 36° takes place in "tens" counter 26 as decimal unit counter 24 is moved from the 9 to the 0 position. This rotation is due to the interaction of teeth 33 with one of the teeth 38 formed on "tens" output disc 37. In a similar manner, as "tens" counter 26 moves from the 9 to the 0 position the "hundreds" counter 28 will be rotated 36° due to the action of tooth 40 intersecting one of the teeth 42 to change the numeral thereon which is in the upright (registering) position.

It is stressed that the above description of a base four system is for purposes of illustration only and the principles utilized in the base four system may be applied equally as well to any other system having any other base other than one. Moreover, if it is not desired to register decimal equivalents then the broad concept of the present invention may be utilized without the parallel decimal registry. Similarly, parallel registration in two different variant bases may be achieved by the principles underlying the present invention; and moreover, comparison with decimal registration and registration in more than one variant base may be simultaneously achieved by obvious modifications to the structure disclosed herein. Moreover, larger numbers may be registered by the addition of higher level registration assemblies in whatever base may be chosen.

A number of variations in the specific structure shown herein may, if found desirable, be adopted. For instance, it is anticipated that a number of registering assemblies may be packaged in a teaching kit with all of the register assemblies having the same base being of a given color to facilitate assembly. For instance, the registration assemblies for the base two might be chosen as blue, while registration assemblies for 3, 4, 5 and 6 might be colored orange, yellow, green and red, respectively, etc. To facilitate quick changing of the registration assemblies, it is contemplated that a ball detent arrangement similar to the ones used commonly on home movie projectors could be used on the stub shafts thereby allowing quick removal of the registration assemblies when it is desired to change the base being demonstrated.

Many other changes and modifications can be made to the embodiment described herein without departing from the spirit of the invention or the scope of the annexed claims.

I claim:
1. An article of manufacture comprising:
   a. unit input means comprising a rotary member having formed thereon;
      1. decimal input means for engaging a portion of said decimal register means during 36° of each 360° of rotation of said rotary member; and
      2. variant base input means for engaging a portion of said variant base register means during $\theta°$ of each 360° of rotation of said m ember wherein:

$$\theta° = \frac{360°}{X}$$

wherein X = an integer other than 1 or 10;
   b. decimal register means in operative engagement with said unit input means for registering the sum of units from said input means in the decimal system; and
   c. variant base register means in operative engagement with said unit input means for registering the sum of units from said unit input means in a counting system having a base other than 10.
2. The article defined in claim 1 wherein said decimal register means comprises:
   a. a decimal unit counter comprising:
      1. a unit input disc positioned to engage said decimal input means during said 36° of rotation of said rotary member, whereby said decimal unit counter is rotated 36° for each 360° of rotation of said unit input means; and
      2. a "tens" output disc integral with said unit input disc and having formed thereon means for engaging a portion of the "tens" counter (hereinafter defined) during 36° of each 360° of rotation of said decimal unit counter; and
   b. a "tens" counter comprising:
      1. a "tens" input disc positioned to engage the "tens" output disc of said decimal unit counter during said 36° of rotation of said decimal unit counter, whereby said "tens" counter is rotated 36° during each 360° of rotation of said decimal unit counter.
3. The article defined in claim 1 wherein said variant base input means comprises:
   a. a variant base unit counter comprising:
      1. a rotary unit input disc positioned to engage said variant base input means during said $\theta°$ of rotation of said rotary input member whereby said variant base unit counter is rotated $\theta°$ for each 360° of rotation of said unit input means; and
      2. a second level output disc integral with said rotary unit input disc and having formed thereon means for engaging a portion of the second level variant base counter (hereinafter defined) during $\theta°$ of each 360° of rotation of said variant base unit counter; and
   b. a second level variant base counter comprising:

1. a second level input disc positioned to engage the second level output disc of said variant base unit counter during said θ° of rotation of the variant base unit counter, whereby said second level variant base counter is rotated θ° during each 360° of rotation of said variant base unit counter.

4. The article defined in claim 3, wherein said decimal register means comprises:
   a. a decimal unit counter in operative engagement with said unit input means for registering from one to 10 units from said unit input means; and
   b. a "tens" counter in operative engagement with said unit counter for registering from one to 10 groups of 10 from said unit counter.

5. The article defined in claim 3, wherein: 1<x<10.

6. An article of manufacture comprising:
   a. rotary unit input means, said unit input means having formed thereon gear means for engaging a portion of the variant base unit counter (hereinafter defined) during θ° of each 360° of rotation of said rotary unit input means;
   b. a variant base unit counter which comprises:
      1. a rotary unit input disc positioned to engage said gear means of aid unit input means during said θ° of rotation of said rotary unit input means whereby said variant base unit counter is rotated θ° for each 360° of rotation of said unit input means;
      2. a rotary unit output disc integral with said unit input disc and having formed thereon gear means for engaging a portion of the second level variant base counter (hereinafter defined) during θ° of each 360° of rotation of said variant base unit counter; and
   c. a second level variant base counter comprising a rotary second level input disc positioned to engage said gear means carried by said unit output disc during said θ° of rotation of said variant base unit counter whereby said second level variant base counter is rotated θ° for each 360° of rotation of said variant base unit counter wherein:

$$\theta° = \frac{360°}{X} \text{ and}$$

X is an integer between from 2 to 9 inclusive.